United States Patent
Niitsuma

(10) Patent No.: US 10,027,906 B2
(45) Date of Patent: Jul. 17, 2018

(54) SEMICONDUCTOR INTEGRATED CIRCUIT THAT STOPS POWER SUPPLY TO AT LEAST A STORAGE AREA OF A FIRST SRAM IN A POWER-SAVING MODE, AND CONTROL METHOD OF SEMICONDUCTOR INTEGRATED CIRCUIT

(71) Applicant: CANON KABUSHIKI KAISHA, Tokyo (JP)

(72) Inventor: Hiroaki Niitsuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/381,300

(22) Filed: Dec. 16, 2016

(65) Prior Publication Data
US 2017/0201697 A1 Jul. 13, 2017

(30) Foreign Application Priority Data
Jan. 7, 2016 (JP) ................................ 2016-001754

(51) Int. Cl.
| | |
|---|---|
| H04N 5/225 | (2006.01) |
| H04N 5/335 | (2011.01) |
| H04N 5/369 | (2011.01) |
| H04N 1/00 | (2006.01) |

(52) U.S. Cl.
CPC ....... *H04N 5/3355* (2013.01); *H04N 1/00885* (2013.01); *H04N 1/00888* (2013.01); *H04N 1/00891* (2013.01); *H04N 5/369* (2013.01)

(58) Field of Classification Search
CPC .................................................. H04N 5/3355
USPC .......................................................... 348/372
See application file for complete search history.

(56) References Cited

U.S. PATENT DOCUMENTS

| | | | |
|---|---|---|---|
| 2013/0082910 A1* | 4/2013 | Lee ...................... | G09G 3/3208 345/76 |
| 2014/0219010 A1 | 8/2014 | Yamaoka et al. ............. | 365/154 |

FOREIGN PATENT DOCUMENTS

JP 2014-149910 8/2014

* cited by examiner

*Primary Examiner* — Usman Khan
(74) *Attorney, Agent, or Firm* — Fitzpatrick, Cella, Harper & Scinto

(57) ABSTRACT

The image forming apparatus of the present invention is a semiconductor integrated circuit including: a first image processing module; a second image processing module; a first SRAM configured to temporarily store image data for which the first image processing has been performed by the first image processing module; a second SRAM configured to store a parameter for performing the second image processing for image data that is input to the second image processing module; and a control unit. The control unit stops power supply to the first SRAM, continues to supply power to a storage area of the second SRAM in which the parameter is stored, and stops power supply to a control area for writing data to the storage area of the second SRAM based on that a condition to cause the semiconductor integrated circuit to make a transition into a power-saving mode is satisfied.

19 Claims, 11 Drawing Sheets

| R | | G | | B | |
|---|---|---|---|---|---|
| in | out | in | out | in | out |
| 0 | 7 | 0 | 7 | 0 | 7 |
| 1 | 9 | 1 | 9 | 1 | 9 |
| 2 | 11 | 2 | 11 | 2 | 11 |
| 3 | 13 | 3 | 13 | 3 | 13 |
| 79 | 49 | 79 | 49 | 79 | 49 |
| 80 | 50 | 80 | 50 | 80 | 50 |
| 81 | 51 | 81 | 51 | 81 | 51 |
| 119 | 118 | 119 | 118 | 119 | 118 |
| 120 | 120 | 120 | 120 | 120 | 120 |
| 121 | 122 | 121 | 122 | 121 | 122 |
| 253 | 253 | 253 | 253 | 253 | 253 |
| 254 | 254 | 254 | 254 | 254 | 254 |
| 255 | 255 | 255 | 255 | 255 | 255 |

FIG.6A

| in | | | out | | |
|---|---|---|---|---|---|
| R | G | B | R | G | B |
| 0 | 0 | 0 | 0 | 0 | 0 |
| 0 | 0 | 1 | 2 | 2 | 2 |
| 0 | 0 | 2 | 4 | 6 | 8 |
| 100 | 130 | 170 | 100 | 130 | 170 |
| 180 | 180 | 180 | 240 | 240 | 240 |
| 255 | 255 | 253 | 255 | 255 | 253 |
| 255 | 255 | 254 | 255 | 255 | 254 |
| 255 | 255 | 255 | 255 | 255 | 255 |

FIG.6B

SEMICONDUCTOR INTEGRATED CIRCUIT THAT STOPS POWER SUPPLY TO AT LEAST A STORAGE AREA OF A FIRST SRAM IN A POWER-SAVING MODE, AND CONTROL METHOD OF SEMICONDUCTOR INTEGRATED CIRCUIT

BACKGROUND OF THE INVENTION

Field of the Invention

The present invention relates to a semiconductor integrated circuit and a control method of a semiconductor integrated circuit.

Description of the Related Art

Generally, an image forming apparatus that operates by switching between a power-saving mode and a normal power mode controls power supply to a semiconductor integrated circuit mounted thereon in accordance with the transition of the power mode. By the configuration such as this, suppression of power consumption as a whole of the image forming apparatus is attempted.

A semiconductor integrated circuit includes a logic circuit that performs arithmetic operation processing and a static memory (SRAM) circuit that is used as a storage area of data. The semiconductor integrated circuit disclosed in Japanese Patent Laid-Open No. 2014-149910 supplies minimum power necessary to hold data in the SRAM circuit while shutting off power supply to the logic circuit at the time of standby. Due to the configuration such as this, it is possible for the semiconductor integrated circuit disclosed in Japanese Patent Laid-Open No. 2014-149910 to make an attempt to save power at the time of standby while holding data in the SRAM. In the semiconductor integrated circuit such as this, the state where minimum power necessary to hold data is supplied to the SRAM is called a resume standby mode (hereinafter, described as "RS mode").

SUMMARY OF THE INVENTION

The semiconductor integrated circuit of the present invention is a semiconductor integrated circuit including: a first image processing module configured to perform first image processing; a second image processing module configured to perform second image processing; a first SRAM configured to temporarily store image data for which the first image processing has been performed by the first image processing module; a second SRAM configured to store a parameter for performing the second image processing for image data that is input to the second image processing module; and a control unit configured to stop power supply to the first SRAM, continue to supply power to a storage area of the second SRAM in which the parameter is stored, and to stop power supply to a control area for writing data to the storage area of the second SRAM based on that a condition to cause the semiconductor integrated circuit to make a transition into a power-saving mode is satisfied.

Further features of the present invention will become apparent from the following description of exemplary embodiments (with reference to the attached drawings).

BRIEF DESCRIPTION OF THE DRAWINGS

FIG. 6A is a diagram showing an example of a one-dimensional LUT in the first embodiment;

FIG. 6B is a diagram showing an example of a three-dimensional LUT in the first embodiment;

DESCRIPTION OF THE EMBODIMENTS

For the image forming apparatus of the prior art, the type of data to be held in the storage area of the semiconductor integrated circuit was not taken into consideration, and therefore, efficient power control was not performed.

For example, it is possible to more suppress power consumption in the power-saving mode in the case where temporary data that is used in the image processing within the image forming apparatus is held in the SRAM to which power supply is shut off than in the case where it is held in the SRAM capable of making a transition into the RS mode.

On the other hand, it is desirable for an image processing parameter, such as a lookup table (hereinafter, described as "LUT"), which is referred to in the image processing within the image forming apparatus, to be held in the SRAM capable of making a transition into the RS mode than to be held in the SRAM to which power supply is shut off. In the case where power supply to the SRAM is shutoff and the image processing parameter is lost, it is necessary to set again the image processing parameter to the SRAM before the image forming apparatus returns to the normal power mode from the power-saving mode. Because of this, extra time is taken to set again the image processing parameter to the SRAM, and therefore, there is a possibility that a delay occurs in the return sequence of the image forming apparatus.

In the following, embodiments for embodying the present invention are explained with reference to the drawings. Components shown in the following embodiments are merely exemplary and the present invention is not limited to the configurations shown schematically.

[First Embodiment]

<Image Forming Apparatus>

Figure 1:
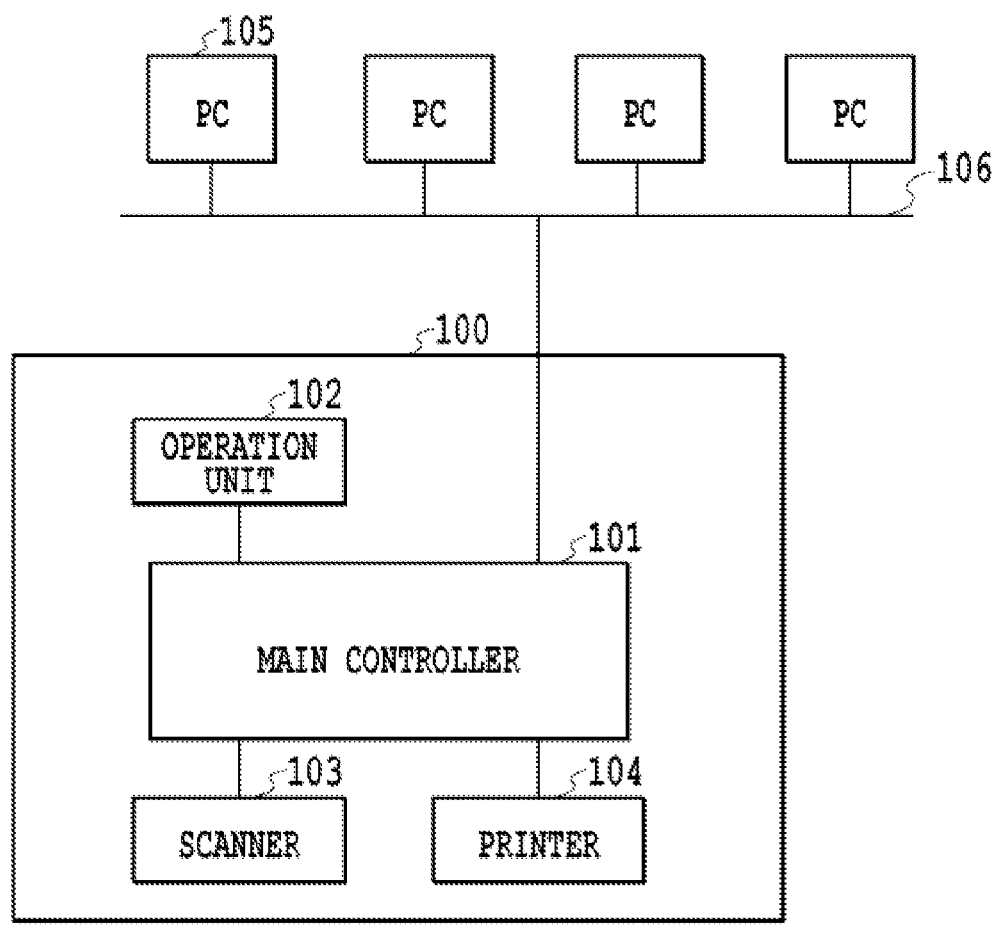
FIG. 1 is a block diagram showing an entire configuration of an image forming apparatus in a first embodiment.

FIG. 1 is a block diagram showing an entire configuration of an image forming apparatus in the present embodiment. An image forming apparatus 100 includes a print function capable of printing an image on a printing medium, such as a sheet. Further, the image forming apparatus 100 includes a scan function capable of scanning a document and transmitting an input image via a network. In the present embodiment, an example is explained in which the image forming apparatus 100 is a multi function printer (hereinafter, described as "MFP").

The image forming apparatus 100 includes a main controller 101, an operation unit 102, a scanner 103, and a printer 104. The operation unit 102, the scanner 103, and the printer 104 are respectively connected to the main controller 101 so as to be capable of communication and are controlled by instructions from the main controller 101.

The main controller 101 is connected to a LAN (Local Area Network) 106 and connected with a PC 105 or the like via the LAN 106. The scanner 103 illuminates an image formed on a sheet and scans a CCD (Charge Coupled Device) head provided with color filters of R (red), G (green), and B (blue). The scanner 103 converts the amount of charges acquired by the CCD into an electric signal indicating RGB color image data or grayscale image data. The printer 104 prints raster image data on a printing medium, such as a sheet.

Figure 2:
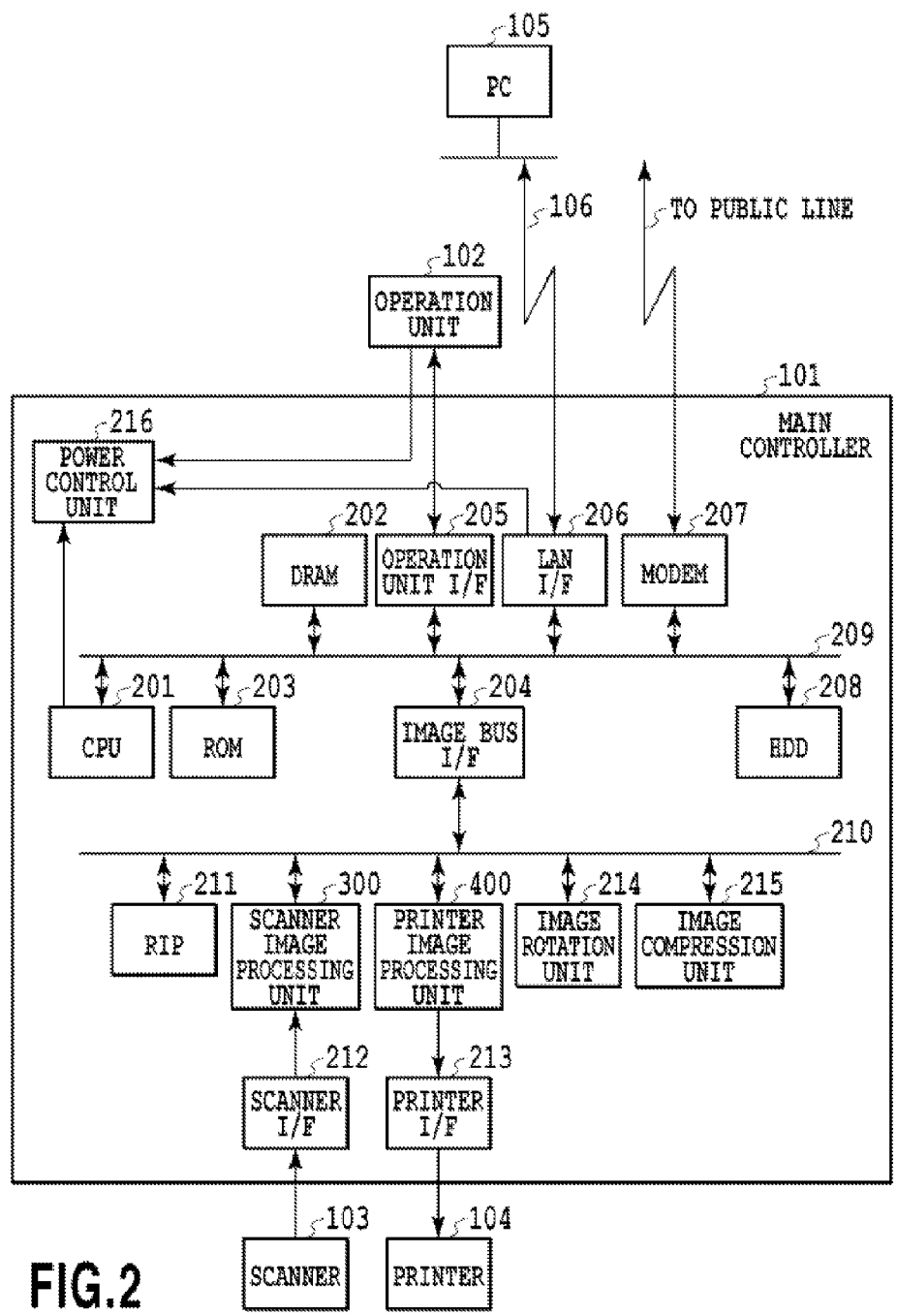
FIG. 2 is a function block diagram of the image forming apparatus in the first embodiment.

FIG. 2 is a function block diagram of the image forming apparatus 100 in the present embodiment. The main controller 101 functions as an image processing apparatus and each function block of the main controller 101 is packaged on a semiconductor integrated circuit, for example, such as an ASIC. In the present embodiment, a plurality of function blocks is packaged on one ASIC, but each function block may be packaged on each individual ASIC. The main controller 101 controls the scanner 103 connected via a scanner interface (hereinafter, interface is described as "I/F") 212 and the printer 104 connected via a printer I/F 213. The main controller 101 is connected to the LAN 106 via a LAN I/F 206 and with the public line via a modem 207. It is possible for the main controller 101 to perform transmission and reception of a file or the like with an external device, such as the PC 105, through the LAN 106 and the public line.

The main controller 101 includes a CPU 201, which is a main control unit. The CPU 201 is connected with a DRAM 202, a ROM 203, an image bus I/F 204, an operation unit I/F 205, the LAN I/F 206, the modem 207, and an HDD (Hard Disk Drive) 208 via a system bus 209.

The DRAM 202 is a main storage device in the main controller 101 and provides the CPU 201 with a work area. The DRAM 202 of the present embodiment is also used as an image memory for temporarily storing image data. The ROM 203 stores a boot program of the system. The operation unit I/F 205 performs transmission between the main controller 101 and the operation unit 102. For example, the operation unit I/F 205 transmits image data for display to the operation unit 102 and transmits information whose input has been received via the operation unit 102 to the CPU 201. The LAN I/F 206 performs transmission between the CPU 201 and the LAN 106. The modem 207 performs transmission between the CPU 201 and the public line. The HDD 208 is an auxiliary storage device and holds various kinds of data, such as image data, address book data, log data, and user data, which is used within the image forming apparatus 100.

The image bus I/F 204 is an interface for transmitting image data at a fast rate between the system bus 209 and an image bus 210 and carries out conversion of the data structure of image data before and after the transmission of the image data. That is, the image bus I/F 204 of the present embodiment functions as a bus bridge.

To the image bus 210, a RIP (Raster Image Processor) 211, a scanner image processing unit 300, a printer image processing unit 400, an image rotation unit 214, and an image compression unit 215 are connected. For example, the RIP 211 develops PDL (Page Description Language) data transmitted from the PC 105 and received via the LAN 106 into a bitmap image.

The scanner I/F 212 is an interface for transmitting image data between the scanner 103 and the main controller 101 (scanner image processing unit 300) and carries out conversion of a synchronous system/an asynchronous system of image data before and after the transmission of the image data. The scanner image processing unit 300 performs image processing, such as color space conversion processing and filter processing, for the image data that is input from the scanner 103 via the scanner I/F 212.

The printer I/F 213 is an interface for transmitting image data between the printer 104 and the main controller 101 (printer image processing unit 400) and performs conversion of a synchronous system/an asynchronous system of image data before and after the transmission of the image data. The printer image processing unit 400 performs image processing, such as color space conversion processing, filter processing, and gamma correction processing, for the image data that is output to the printer 104 via the printer I/F 213.

The image rotation unit 214 performs processing to rotate image data. The image compression unit 215 performs compression/decompression processing for various kinds of image data. Specifically, the image compression unit 215 performs JPEG compression/decompression processing for multivalued image data and performs compression/decompression processing, such as JBIG, MMR, and MH, for binary image data.

A power control unit 216 performs power control of the image forming apparatus 100 based on a control signal from the operation unit 102, the CPU 201, and the LAN I/F 206. The power control unit 216 of the present embodiment performs power control so as to cause the image forming apparatus 100 to operate by switching between the normal power mode and the power-saving mode. In the present embodiment, the normal power mode refers to a state where power is supplied to each function block of the image forming apparatus 100 and it is possible to perform an operation, such as printing, in accordance with a job whose input has been received. The power-saving mode refers to a state where power to each function block within the image forming apparatus 100 is shut off and power consumption is small compared to that in the normal power mode.

The main function block of the image forming apparatus 100 refers to, for example, the printer image processing unit 400, the RIP 211, the CPU 201, etc., which are necessary to cause the printer 104 to perform a printing operation in accordance with a job whose input has been received in the normal power mode. On the other hand, for example, the LAN I/F 206 that detects job reception from the PC 105 in the power-saving mode, the power control unit 216, etc., do not correspond to the main function block.

Figure 3:
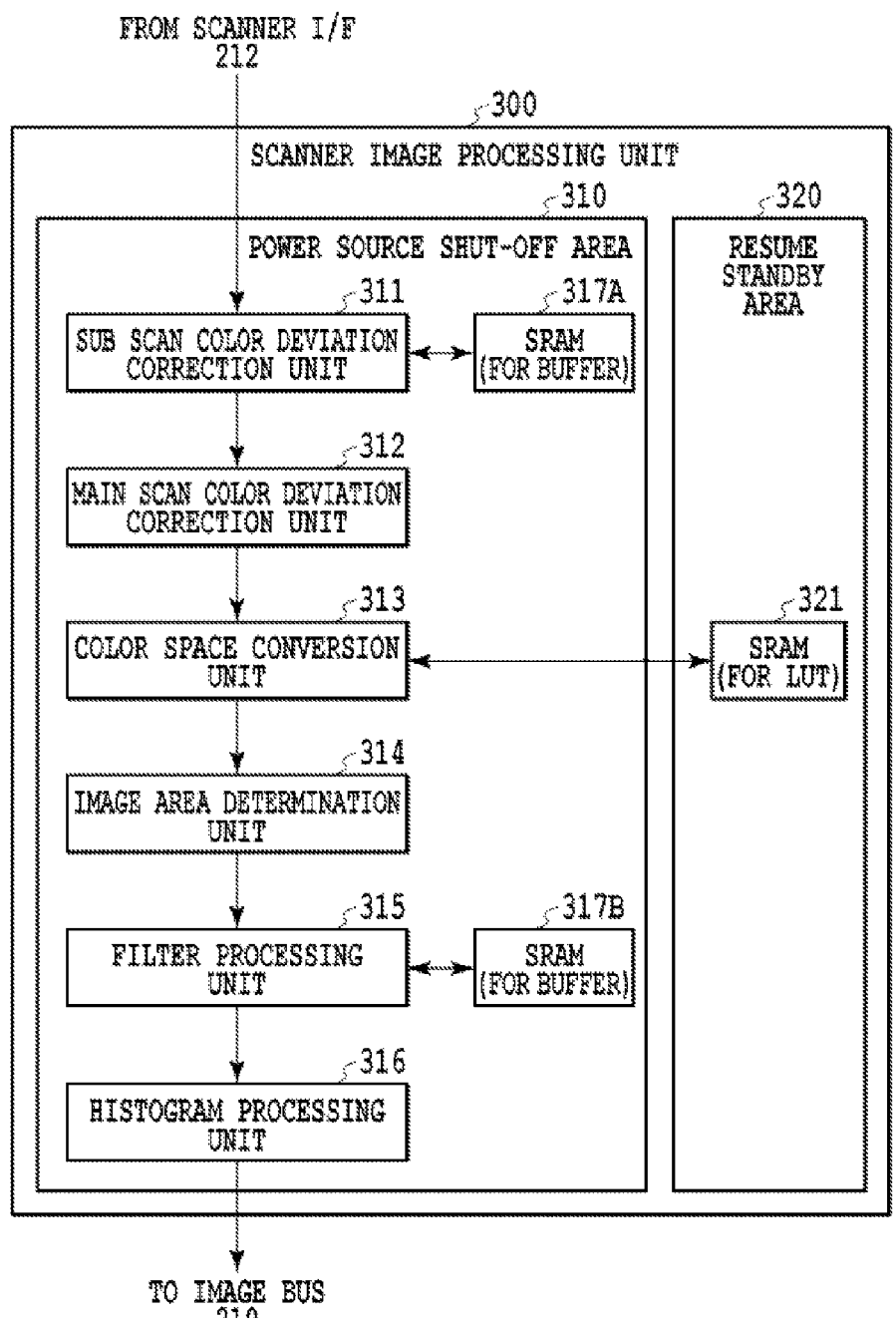
FIG. 3 is a function block diagram of a scanner image processing unit in the first embodiment.

FIG. 3 is a function block diagram of the scanner image processing unit 300. The scanner image processing unit 300 of the present embodiment makes up an image processing module group that performs image processing necessary for the image forming apparatus 100 to cause the scanner 103 to operate to read an image. The scanner image processing unit 300 is, for example, packaged on a semiconductor integrated circuit, for example, such as an ASIC, and the semiconductor integrated circuit includes a logic circuit configured to perform an arithmetic operation necessary for image processing, and an SRAM that is used as a storage area of data.

A sub scan color deviation correction unit 311 is an image processing module that corrects color deviation in the sub scanning direction of image data that is input by the scanner 103. For example, the sub scan color deviation correction unit 311 performs a matrix arithmetic operation for 8-bit pixel data of each color of RGB of image data by using a filer having a size of 1-pixel×3-pixel with a pixel of interest as a center. The sub scan color deviation correction unit 311 performs a matrix arithmetic operation for image data by scanning the pixel of interest one by one in the main scanning direction. At this time, the sub scan color deviation correction unit 311 stores pixel data continuous in the main scanning direction in an SRAM 317A for line buffer in accordance with the scan of the pixel of interest. The detailed configuration of the SRAM 317A and details of the matrix arithmetic operation using a filter will be described later.

A main scan color deviation correction unit 312 is an image processing module that corrects color deviation in the main scanning direction of image data. For example, the main scan color deviation correction unit 312 performs a matrix arithmetic operation for 8-bit pixel data of each color of RGB of image data by using a filter having a size of 5-pixel×1-pixel with a pixel of interest as a center.

A color space conversion unit 313 is an image processing module that converts image data dependent on the characteristics of the scanner 103 into image data in a device-independent color space. In the present embodiment, the color space conversion unit 313 refers to a lookup table (hereinafter, described as "LUT") that is held in an SRAM 321 and converts image data dependent on the characteristics of the scanner 103 into image data in a device-independent color space. The detailed configuration of the SRAM 321 will be described later.

An image area determination unit 314 is an image processing module that determines in which portion, such as a character portion, a photo portion, a chromatic portion, and an achromatic portion, the pixel of interest in image data is included and generates attribute flag data indicating the portion for each pixel.

A filter processing unit 315 is an image processing module that corrects image data to image data having desired spatial frequency characteristics. The filter processing unit 315 performs a matrix arithmetic operation for 8-bit pixel data of each color of RGB of image data by using a filter having a size of 5-pixel×5-pixel with a pixel of interest as a center.

Figure 5:
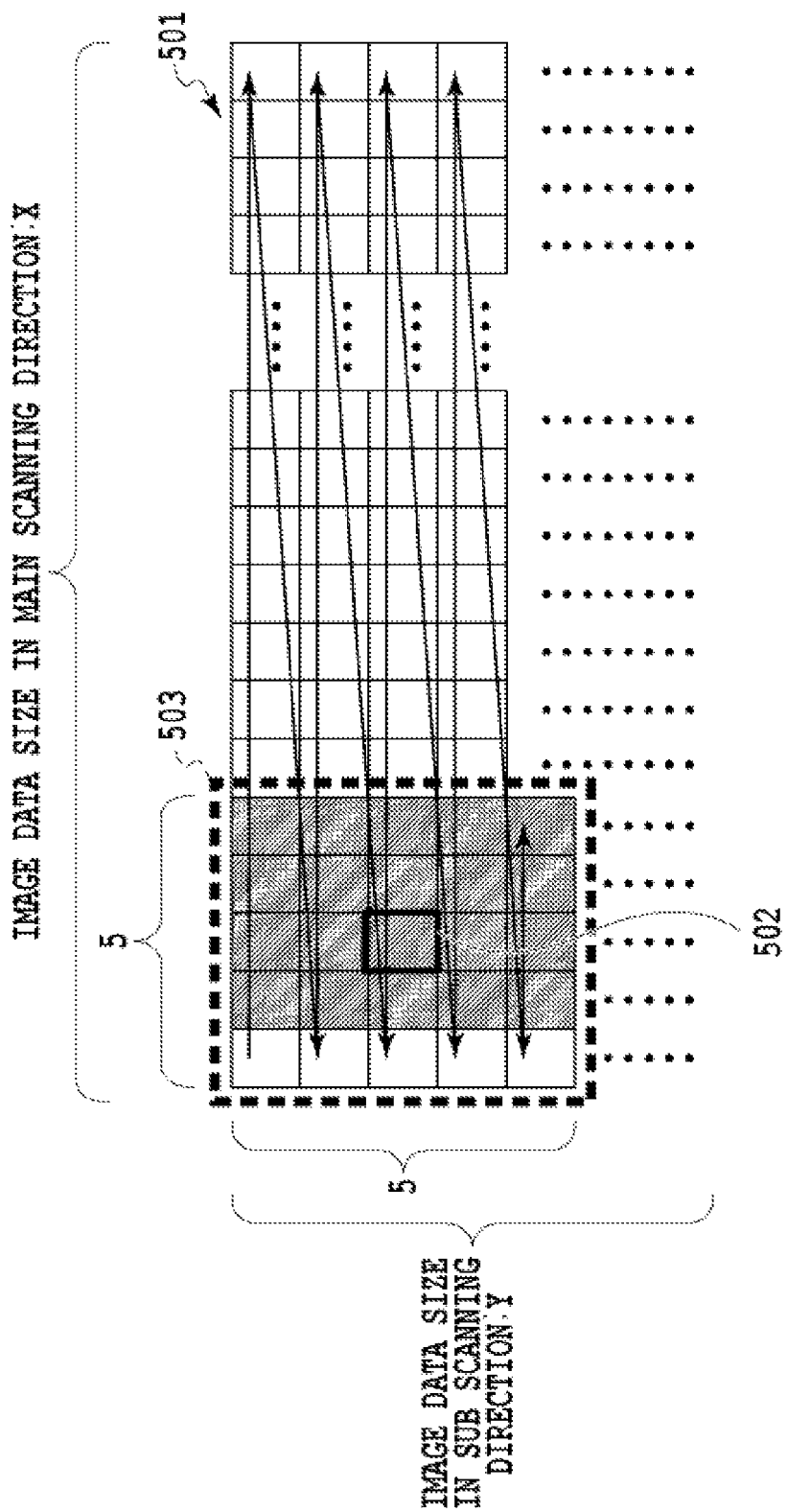
FIG. 5 is a diagram explaining an outline of filter processing in the first embodiment.

Here, an outline of filter processing in the present embodiment is explained with reference to FIG. 5. FIG. 5 shows an example in which the filter processing unit 315 performs a matrix arithmetic operation for image data 501 having an X-pixel size in the main scanning direction and a Y-pixel size in the sub scanning direction by using a filter 503 having a size of 5-pixel×5-pixel with a pixel of interest 502 as a center.

The filter processing unit 315 performs a matrix arithmetic operation for pixel data in an area (window) of the image data 501 that overlaps the filter 503 while scanning the pixel of interest 502 in an arrow direction of the image data 501. Pixel data corresponding to four lines indicated with hatching is pixel data used also in the next matrix arithmetic operation in the case where the pixel of interest 502 is scanned by one pixel. The filter processing unit 315 stores pixel data in an SRAM 317B for line buffer, which corresponds to four lines continuous in the sub scanning direction, in order to sequentially perform the matrix arithmetic operation. It can be said that the pixel data stored in the SRAM for line buffer such as this is temporary image data for which processing has been performed by the image processing module.

Returning to FIG. 3 again, a histogram processing unit 316 is an image processing module that further corrects image data by creating a distribution from pixel data making up image data and changing the created distribution.

The processing in the scanner image processing unit 300 explained above is not limited to the processing by the sub scan color deviation correction unit 311 to the histogram processing unit 316 and a function block that performs another kind of image processing may be included. Further, part of the processing by the sub scan color deviation correction unit 311 to the histogram processing unit 316 may be omitted. Furthermore, the order of the processing by the sub scan color deviation correction unit 311 to the histogram processing unit 316 is not limited to the order explained above.

Figure 4:
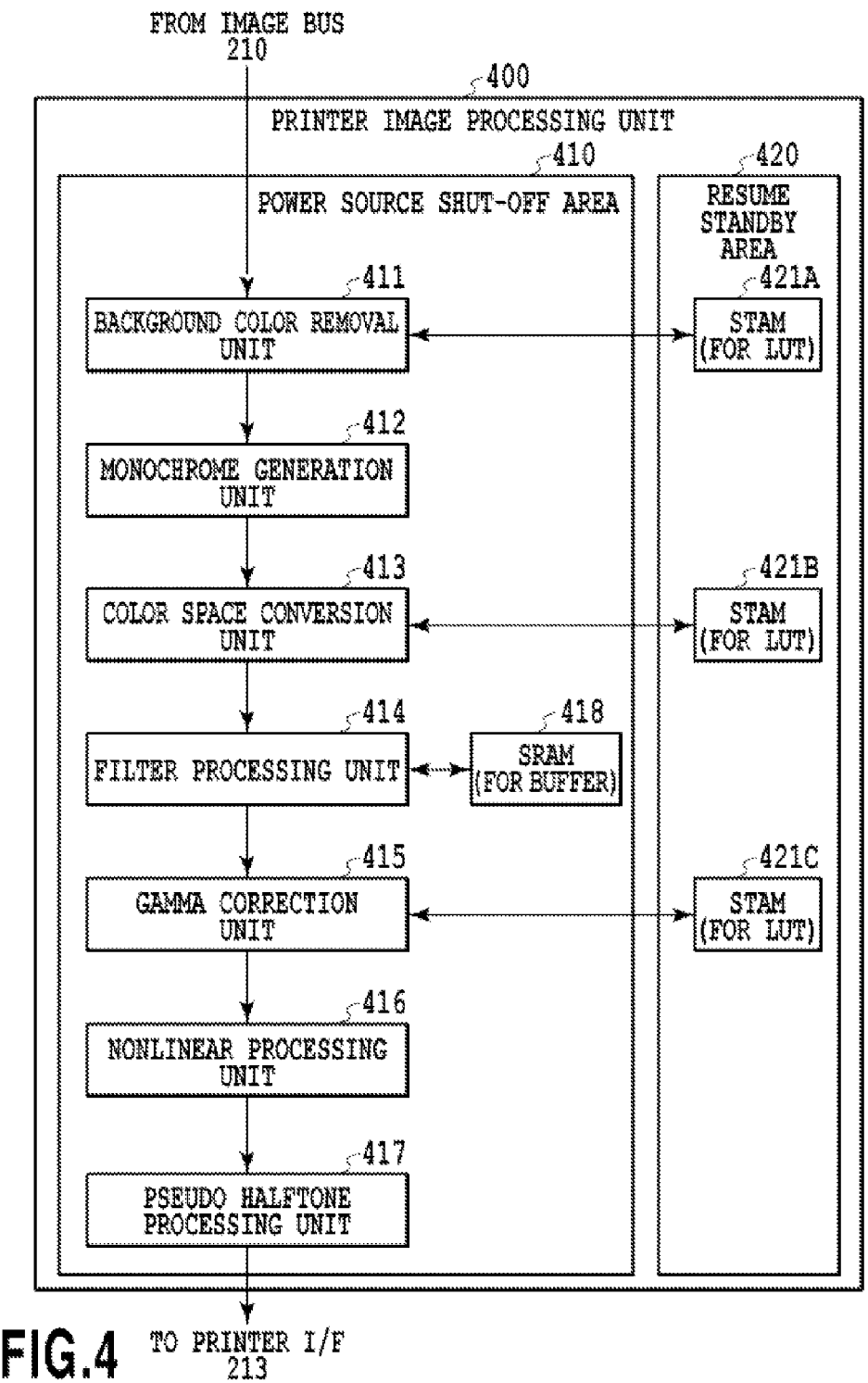
FIG. 4 is a function block diagram of a printer image processing unit in the first embodiment.

FIG. 4 is a function block diagram of the printer image processing unit 400. The printer image processing unit 400 of the present embodiment makes up an image processing module group that performs image processing necessary for the image forming apparatus 100 to cause the printer 104 to operate to output an image on a printing medium, such as a sheet. The printer image processing unit 400 is packaged on, for example, a semiconductor integrated circuit, such as an ASIC, and the semiconductor integrated circuit includes a logic circuit that performs an arithmetic operation necessary for image processing, and an SRAM circuit that is used as a storage area of data.

A background color removal unit 411 is an image processing module that performs background color removal processing to remove an unnecessary hue included in the image data. In the present embodiment, the background color removal unit 411 refers to a one-dimensional LUT that is held in an SRAM 421A and performs background color removal processing for image data. The detailed configuration of the SRAM 421A will be described later.

Here, an example of the one-dimensional LUT in the present embodiment is explained with reference to FIG. 6A. FIG. 6A shows a description example of the one-dimensional LUT that is referred to in the background color removal processing or the like of the present embodiment. As shown in FIG. 6A, the one-dimensional LUT of the present embodiment is a conversion table in which the input value (in) and the output value (out) are associated with each other for each of RGB.

The image forming apparatus 100 of the present embodiment performs processing to write setting values (input value and output value) of the one-dimensional LUT read from the ROM 203 to an SRAM for LUT, i.e., LUT setting processing in the initial activation sequence.

The LUT setting processing of the present embodiment is explained in more detail. The setting values of the LUT are stored in the ROM 203 in the compressed state in order to reduce the capacity. In the initial activation sequence, the CPU 201 temporarily develops the setting values of the LUT read from the ROM 203 onto the RAM 202. The CPU 201 further writes the setting values of the LUT developed onto the RAM 202 to the SRAM for LUT by DMA (Direct Memory Access).

In the case where the setting values of the LUT are lost in the power-saving mode, it is necessary to set again the image processing parameters in the SRAM before the image processing apparatus returns to the normal power mode from the power-saving mode. In the present embodiment, the SRAM to which the setting values of the LUT are written is in the resume standby area and minimum power necessary to hold data is supplied also in the power-saving mode, and therefore, the setting values of the LUT are not lost. That is, the time that can be reduced at the time of return of the image forming apparatus 100 to the normal power mode from the power-saving mode corresponds to the time taken for the above-described CPU 201 to write the setting values of the LUT developed onto the DRAM 202 to the SRAM for LUT by the DAM.

Returning to FIG. 4 again, a monochrome generation unit 412 is an image processing module that converts color image data into monochrome image data in the case where the printer 104 is caused to output a single color image. For example, the monochrome generation unit 412 converts color image data into monochrome image data by performing a matrix arithmetic operation to multiply the pixel data of the color image data by an arbitrary constant.

A color space conversion unit 413 is an image processing module that converts image data into image data compatible with the characteristics of the printer 104. In the present embodiment, the color space conversion unit 413 refers to a three-dimensional LUT that is held in an SRAM 421B and performs color space conversion processing for the image data.

Here, an example of the three-dimensional LUT in the present embodiment is explained with reference to FIG. 6B. FIG. 6B shows a description example of the three-dimensional LUT that is referred to in color space conversion processing or the like of the present embodiment. As shown in FIG. 6B, the three-dimensional LUT of the present embodiment is a conversion table in which a combination (in) of input values of each color of RGB and a combination (out) of output values of each color of RGB are associated with each other.

The color space conversion unit 413 refers to the three-dimensional LUT, which is a conversion table, maps the combination of input values of each color of RGB and the combination of output values of each color of RGB, and converts input image data into output image data compatible with the characteristics of the printer 104. As described above, the LUT that is referred to in color space conversion processing or the like can be said parameters for performing image processing. Image processing parameters are not limited to the one-dimensional or three-dimensional LUT, and for example, various parameters, such as CDL (Color Decision List) parameters for adjusting the color or the like of image data, and coefficients are also included.

The image forming apparatus 100 of the present embodiment performs processing to write setting values (combination of input values and combination of output values) of the three-dimensional LUT read from the ROM 203 to the SRAM for LUT, i.e., LUT setting processing in the initial activation sequence.

A filter processing unit 414 is an image processing module that corrects image data to image data having desired spatial frequency characteristics. The filter processing unit 414 performs a matrix arithmetic operation for 8-bit pixel data of each color of RGB of image data by using a filter having a size of 5-pixel×5-pixel with a pixel of interest as a center. At this time, the filter processing unit 414 stores pixel data corresponding to four lines continuous in the sub scanning direction in an SRAM 418 for line buffer in accordance with the scan of the pixel of interest. The detailed configuration of the SRAM 418 will be described later.

A gamma correction unit 415 is an image processing module that performs gamma correction of image data so that the image data becomes image data compatible with the characteristics of the printer 104. In the present embodiment, the gamma correction unit 415 refers to the one-dimensional LUT that is held in an SRAM 421C and performs gamma correction processing for the image data.

A nonlinear processing unit 416 is an image processing module that performs an arithmetic operation of the color material amount for each piece of pixel data of each color of RGB. By the nonlinear processing, the image that is output from the printer 104 is suppressed from showing on the backside and besides this, in the case of the operation in the toner-saving mode, the amount of used toner of the image that is output from the printer 104 is suppressed.

A pseudo halftone processing unit 417 is an image processing module that performs pseudo halftone processing to convert image data into image data with a desired tone level in accordance with the number of tone levels of the printer 104. The pseudo halftone processing unit 417 converts image data into image data with a desired tone level so as to correspond to the number of tone levels of the printer 104 by a method, such as the publicly known screen processing and the publicly known error diffusion processing.

The processing in the printer image processing unit 400 explained above is not limited to the processing by the background color removal unit 411 to the pseudo halftone processing unit 417 and a function block that performs another kind of image processing may be included. Further, part of the processing by the background color removal unit 411 to the pseudo halftone processing unit 417 may be omitted. Furthermore, the order of the processing by the background color removal unit 411 to the pseudo halftone processing unit 417 is not limited to the order explained above.

Figure 7:
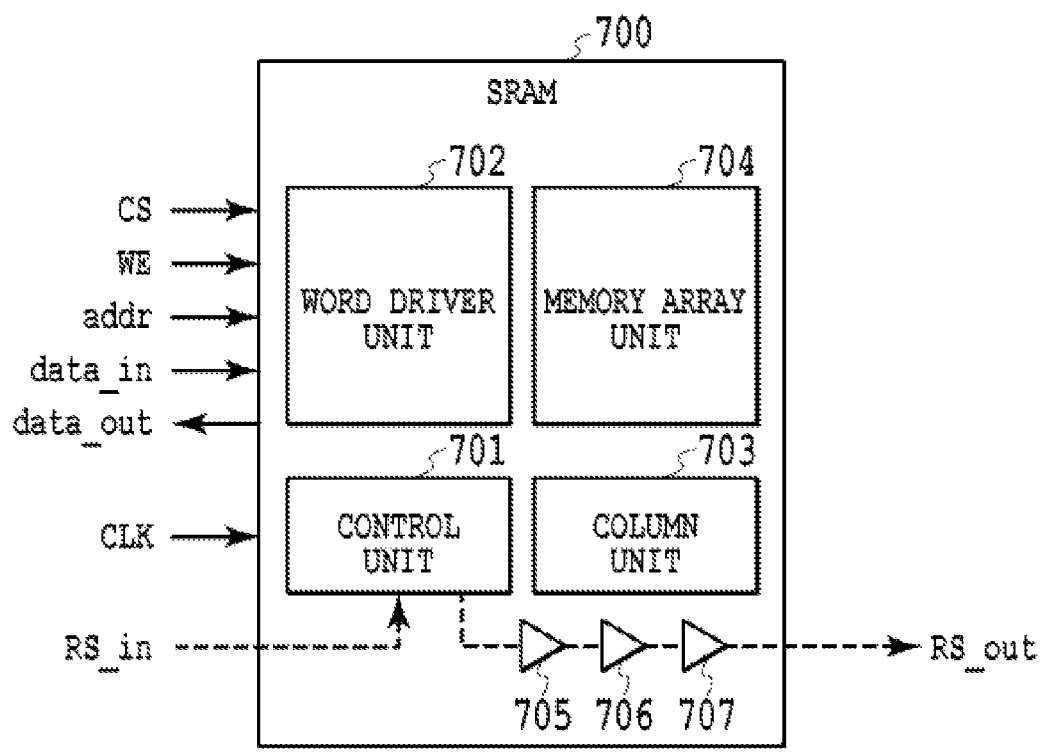
FIG. 7 is a block diagram showing a detailed configuration of an SRAM in the first embodiment.

FIG. 7 is a block diagram showing a detailed configuration of an SRAM 700 in the present embodiment. In the present embodiment, as each of the SRAMs 317, 321, 418, and 421, the SRAM with the configuration shown in FIG. 7 is used.

As shown in FIG. 7, to the SRAM 700, a plurality of kinds of signal is input. A CS signal and a WE signal are input signals for controlling the operation timing of the SRAM 700 like the signals used for common memory control. An addr signal, a data_in signal, and a CLK signal are input signals for address control, input data control, and clock control like signals used for common memory control. An RS_in signal is an input signal that is output from the power control unit 216 and which controls the transition into the RS mode and the return to the normal power mode.

Further, as shown in FIG. 7, a plurality of kinds of signal is output from the SRAM 700. A data_out signal is an output signal for output data control like the signals used for common memory control. An RS_out signal is output to another SRAM (not shown schematically) and used in the other SRAM to control the transition into the RS mode and the return to the normal power mode. The SRAM 700 has a so-called signal relay function to relay the RS signal to another SRAM.

A control unit 701 includes a timing control circuit that generates a timing signal of the operation from the CS signal and the WE signal. Further, the control unit 701 includes a circuit that controls the power sources of a word driver unit 702 and a column unit 703 in accordance with the RS_in signal and shuts off the power of the word driver unit 702 and the column unit 703 in the case where the RS_in signal is at High. Furthermore, it is possible to shut off the power source in the case where the RS_in signal is at High in addition to the RS control of the control unit 701. The RS-in signal is output as the RS_out signal by delaying the RS-in signal by the control unit 701 or buffer cells 705 to 707.

The word driver unit 702 is a function block that decodes the addr signal and determines which row of a memory array unit 704 is to be activated. The power of the word driver unit 702 is shut off in the RS mode by the control unit 701.

The column unit 703 is a function block that decodes the addr signal and determines which column of the memory array unit 704 is to be activated. The power of the column unit 703 is shut off in the RS mode by the control unit 701.

In the present embodiment, fluctuations in voltage in the memory array unit 704 are suppressed by preventing the power shut-off of the word driver unit 702 and the column unit 703 from overlapping the oscillation of the clock signal at the time of transition into the RS mode. The control unit 701, the word driver unit 702, and the column unit 703 of the RAM 700 as described above can be said a so-called control area for writing data to the memory array unit 704.

The memory array unit 704 is made up of static memory cells arranged in the form of a matrix and holds data in a memory cell determined by the word driver unit 702 and the column unit 703. The memory array unit 704 remains energized also in the RS mode, and due to this, it is possible to hold data in the RS mode. The memory array unit 704 in the SRAM 700 such as this can be said a so-called storage area in which parameters for performing image processing are stored.

In the present embodiment, by the power control unit 216 setting in advance whether or not to output the RS signal, it is possible to control to maintain power supply to the SRAM 700 or to shut off power supply to the SRAM 700 in the power-saving mode. Due to the configuration such as this, whether the SRAM 700 is used as the SRAMs 321 and 421 in the resume standby area or as the SRAMs 317 and 418 in the power source shut-off area 310 are determined.

<Power-saving Mode>

The image forming apparatus 100 has the normal power mode and the power-saving mode in which power consumption is smaller than that in the normal power mode. In the normal power mode, the power control unit 216 supplies power to each function block of the main controller 101 and performs control so as to bring about the state where the image forming apparatus 100 can receive a job via the I/F 206 or the like. On the other hand, in the power-saving mode, the power control unit 216 shuts off power to the main function block of the main controller 101 and performs control so that the power consumption of the image forming apparatus 100 is small compared to that in the normal power mode. As a result of this, in the power-saving mode, it is possible to suppress the power consumption of the image forming apparatus 100 compared to that in the normal power mode.

The image forming apparatus 100 of the present embodiment mounts a semiconductor integrated circuit (ASIC) compatible with the RS mode and an image processing module group, such as the scanner image processing unit 300 and the printer image processing unit 400, is packaged on one or a plurality of ASICs. To the SRAMs 321 and 421 capable of making a transition into the RS mode, minimum power necessary to hold data is supplied even in the case where power supply to the power source shut-off areas 310 and 410 is shut off. Because of this, it is possible for the main controller 101 to cause the SRAMs 321 and 421 to hold LUT data while reducing the leak current in the power-saving mode.

On the other hand, data that is held in the SRAMs 317 and 418 whose power supply is shut off in the power-saving mode is lost in the case where the power supply is shut off. In the present embodiment, temporary data that is used in the image processing by the image processing module is held in the SRAMs 317 and 418 provided within the power source shut-off areas 310 and 410, but the loss of the temporary data such as this in the transition sequence into the power-saving mode will bring about no problem. Because of this, it is possible to further suppress the power consumption of the image forming apparatus 100 by shutting off the power supply to the SRAMs 317 and 418 in the power-saving mode.

In the case where each I/F of the main controller 101 receives an event notification, the image forming apparatus 100 returns to the normal power mode from the power-saving mode. In the present embodiment, in the case where the LAN I/F 206 receives a print job from the PC 105 or the like, and in the case where the operation unit I/F 205 receives return instructions from a user, which are input via the operation unit 102, each of the LAN I/F 206 and the operation unit I/F 205 notifies the power control unit 216 of the event.

The power control unit 216 performs control to supply power for each function block, such as the CPU 201 and the RIP 211. As described previously, in the power-saving mode, the power control unit 216 stops the supply of power to the power source shut-off areas 310 and 410 within the scanner image processing unit 300 and the printer image processing unit 400. The power control unit 216 supplies minimum power necessary to hold data to the SRAMs 321 and 421 in the resume standby areas 320 and 420 and causes the image forming apparatus 100 to make a transition into the RS mode.

In response to the image forming apparatus 100 returning to the normal power mode from the power-saving mode, the power control unit 216 resumes the power supply to the function block, such as the scanner image processing unit 300 and the printer image processing unit 400. At this time, the LUT data of the SRAMs 321 and 421 in the resume standby areas 320 and 420 is not lost, and therefore, it is not necessary for the CPU 201 to perform the LUT setting processing again. In the power-saving mode, the power control unit 216 supplies power necessary for the self-refresh operation to the DRAM 202. Due to this, it is possible to back up the system program for causing the image forming apparatus to operate.

<Transition Sequence of Power Mode>

Figure 8:
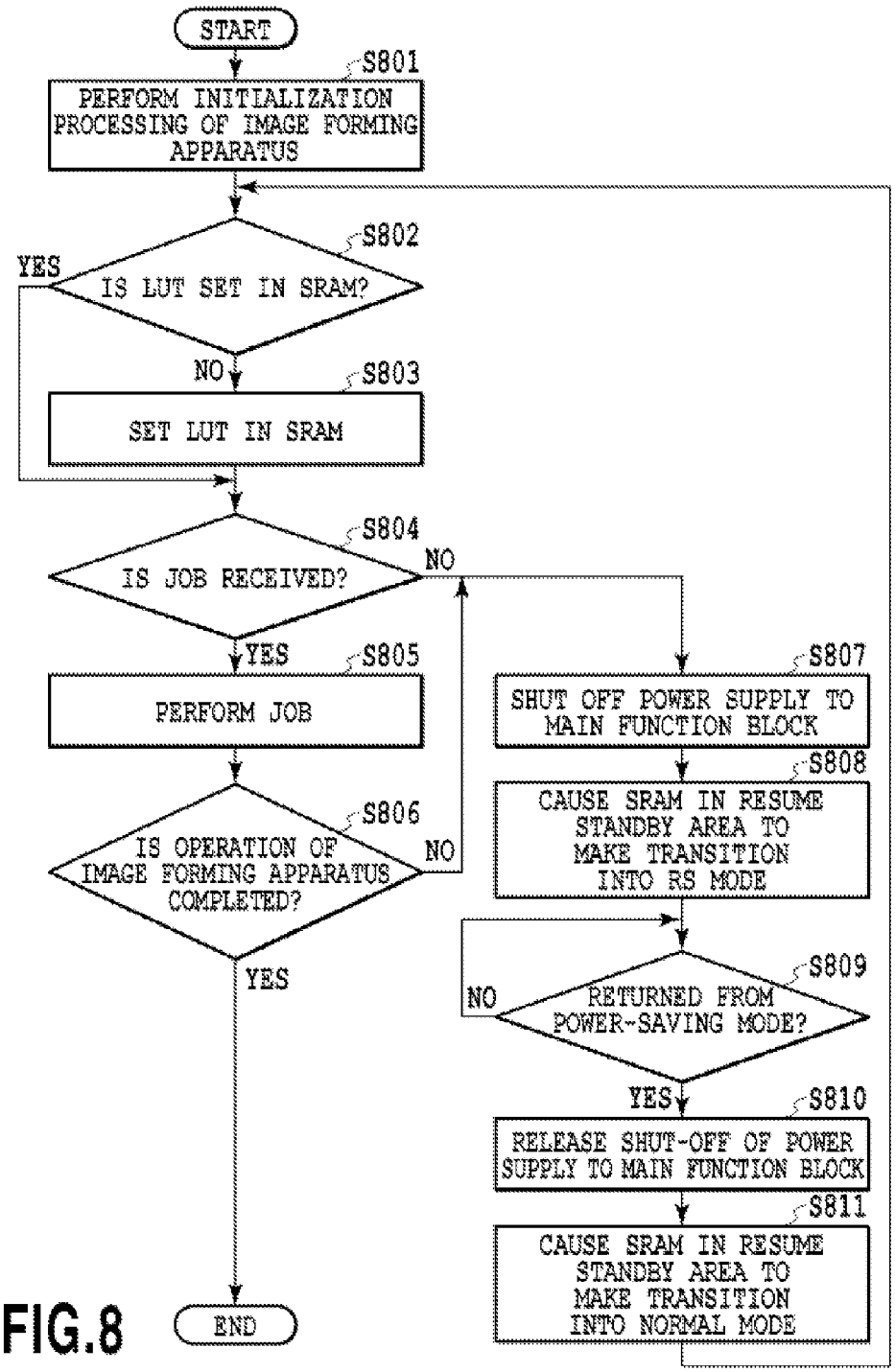
FIG. 8 is a flowchart showing a procedure of a transition sequence in the first embodiment.

FIG. 8 is a flowchart showing a procedure of a transition sequence of the power mode. The processing by this flowchart is implemented by the CPU 201 of the main controller 101 executing the program stored in the ROM 203.

At S801, the image forming apparatus 100 performs initialization processing. At this time, the image forming apparatus 100 is in the activation state immediately after the power source is turned on and the CPU 201 performs, for example, initialization processing of the DRAM 202, in accordance with the boot program that is read from the ROM 203.

At S802, the CPU 201 determines whether the LUT is set in the SRAMs 321 and 421 within the scanner image processing unit 300 and the printer image processing unit 400. It is possible to perform the determination at S802 by using a flag that is set at S803, to be described later. After the initial activation of the image forming apparatus 100, the flag is not changed to a flag indicating that the LUT has already been set (S802: NO), and the CPU 201 proceeds to S803 in order to perform the processing to set the LUT to the SRAMs 321 and 421. On the other hand, in the return sequence (in the case where the processing proceeds from S811 to S802), the flag is changed to a flag indicating that the LUT has already been set (S802: YES), and therefore, the CPU 201 skips S803 and proceeds to S804.

At S803, the CPU 201 performs the processing to set the LUT to the SRAMs 321 and 421 and changes the flag to a flag indicating that the LUT has already been set.

At S804, the CPU 201 determines whether a job instructing to scan an image or to output an image has been received. In the case where each I/F has received the job (S804: YES), the CPU 201 proceeds to S805 and causes the scanner 103 or the printer 104 to perform desired processing based on the received job.

At S806, in the case where the operation of the image forming apparatus 100, such as scanning of an image by the scanner 103 and outputting of an image by the printer, has been completed (S806: YES), the processing by this flowchart is terminated. On the other hand, in the case where the operation of the image forming apparatus 100 is continued (S806: NO), the CPU 201 proceeds to S807.

At S807, the CPU 201 starts the processing to cause the image forming apparatus 100 to make a transition from the normal power mode into the power-saving mode. Specifically, the CPU 201 causes the power control unit 216 to shut off the power source to the main function block of the main controller 101.

At S808, the CPU 201 causes the SRAMs 321 and 421 in the resume standby areas 320 and 420 to make a transition into the RS mode as well as causing the power control unit 216 to stop the supply of power to the power source shut-off areas 310 and 410.

At S809, the CPU 201 determines whether to return the image forming apparatus 100 to the normal power mode from the power-saving mode. In the present embodiment, the CPU 201 causes the image forming apparatus 100 to return to the normal power mode in the case where each I/F of the main controller 101 receives the event notification.

In the case of determining to cause the image forming apparatus 100 to return to the normal power mode (S809: YES), at S810, the CPU 201 causes the power control unit 216 to release the shut-off of the power supply to the main function block of the main controller 101.

At S811, the CPU 201 causes the power control unit 216 to resume the power supply to the SRAMs 321 and 421 in the resume standby areas 320 and 420. After S811, the image forming apparatus 100 returns to the normal power mode.

At S802, the CPU 201 determines again whether the LUT is set in the SRAMs 321 and 421 within the scanner image processing unit 300 and the printer image processing unit 400. At this time, the flag is set to a flag indicating that the LUT has already been set (S802: YES), and therefore, the CPU 201 skips S803 and proceeds to S804.

As explained above, the image forming apparatus of the present embodiment causes the SRAM in which the LUT is set to make a transition into the RS mode while shutting off the power supply to the SRAM holding temporary data that is used in the image processing in the power-saving mode. Due to the configuration such as this, it is possible not only to further suppress the power consumption as a whole of the image forming apparatus but also to reduce the time taken for the image forming apparatus to return to the normal power mode from the power-saving mode.

[Second Embodiment]

In the following, the present embodiment is explained with reference to FIG. 9. In the explanation of the present embodiment, the same numerical references are attached to the same configurations as those of the first embodiment and explanation of the duplicated contents is omitted.

In the printer image processing unit 400 of the first embodiment, the SRAM 421 for storing LUT is arranged in the resume standby area 420 (FIG. 4). With the configuration of the printer image processing unit 400 of the first embodiment, there is a case where the SRAM 421 receives an unwanted signal, such as noise, from another power source area (e.g., the power source shut-off area 410). Because of this, it is necessary to protect the SRAM 421 by an isolator or the like in order to prevent interference between the SRAM 421 and another power source area.

However, as the area defined by an isolator increases in number in one ASIC, the circuit scale of the ASIC increases and an increase in power consumption, an increase in the manufacturing cost, etc., will result. In view of the above-described circumstances, the image forming apparatus 100 of the present embodiment has such a configuration in which the SRAM for storing LUT is arranged in the power source shut-off area 410 and in the resume standby area 420 in accordance with the data capacity of the LUT.

Figure 9:
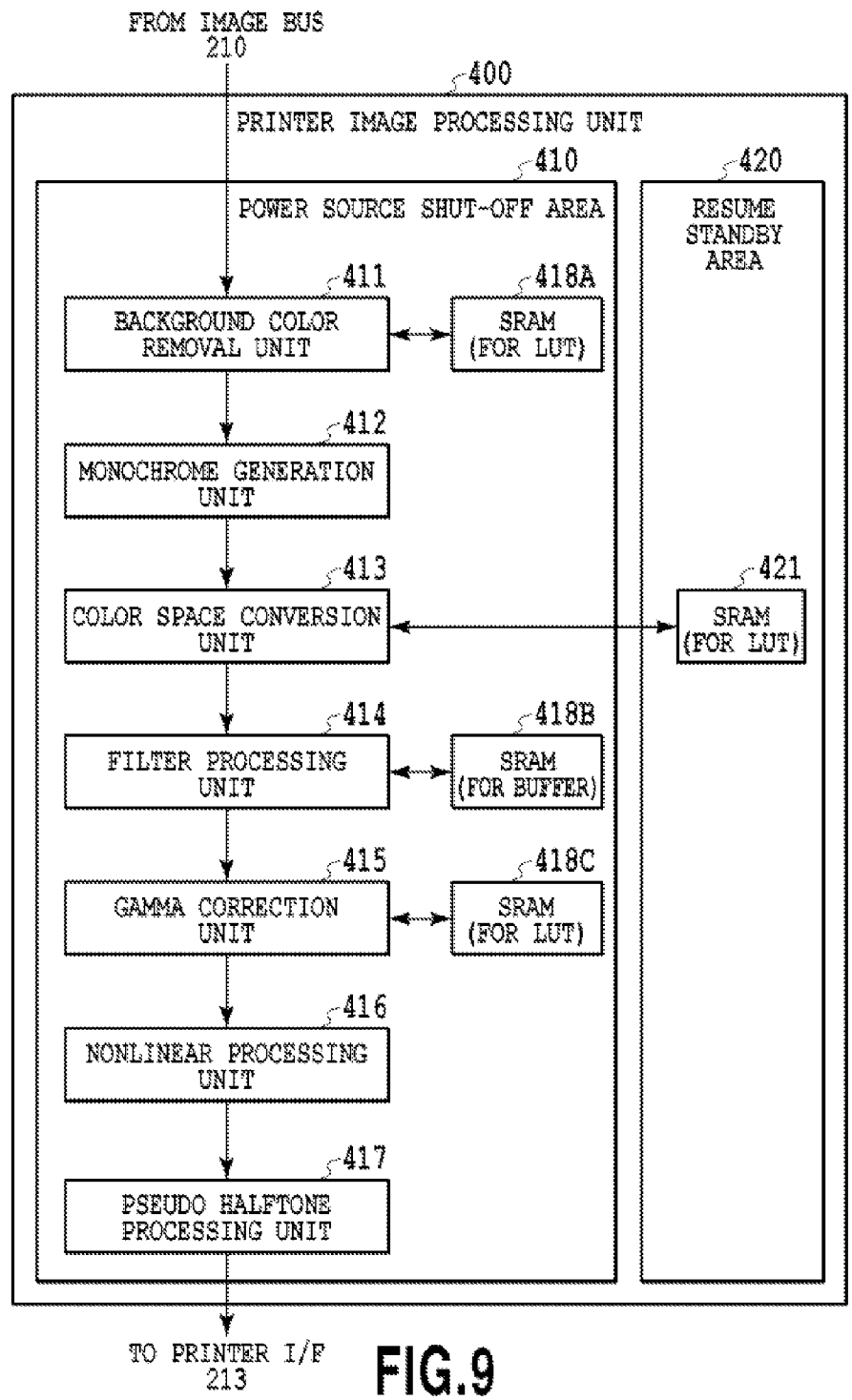
FIG. 9 is a function block diagram of a printer image processing unit in a second embodiment.

FIG. 9 is a function block diagram of the printer image processing unit 400 in the present embodiment. In the present embodiment, explanation is given by showing only the function block diagram of the printer image processing unit 400, but it is also possible to cause the scanner image processing unit 300 to have the same configuration. As explained in the above-described first embodiment, in the image processing sequence performed by the printer image processing unit 400, the background color removal unit 411 and the gamma correction unit 415 refer to the one-dimensional LUT and the color space conversion unit 413 refers to the three-dimensional LUT.

The amount of LUT data of the three-dimensional LUT that the color space conversion unit 413 refers to is larger than that of the one-dimensional LUT that the background color removal unit 411 and the gamma correction unit 415 refer to. Because of this, in the case where the image forming apparatus 100 returns to the normal power mode from the power-saving mode, the CPU 201 requires a time longer than a predetermined time (e.g., the time necessary for the CPU 201 to set the one-dimensional LUT again) to set the three-dimensional LUT again. Consequently, in the present embodiment, the SRAM 421 that holds the three-dimensional LUT is arranged in the resume standby area 420 and the SRAMs 418A and 418C that hold the one-dimensional LUT is arranged in the power source shut-off area, respectively.

In the power-saving mode, the power control unit 216 shuts off the power supply to the power source shut-off area 410 including the SRAMs 418A and 418C. Consequently, compared to the first embodiment, it is possible for the image forming apparatus 100 of the second embodiment to save the power consumption necessary for causing the SRAMs 418A and 418C to make a transition into the RS mode.

The areas for which the power source is controlled, such as the power source shut-off area 410 and the resume standby area 420, are determined in the design stage of the ASIC, and therefore, it is not possible to dynamically change the areas while the main controller 101 is in operation. Because of this, it is necessary to design the ASIC by taking into consideration the balance between the power consumption of the image forming apparatus 100 in the power-saving mode and the time taken for the image forming apparatus 100 to return to the normal power mode from the power-saving mode.

[Third Embodiment]

In the following, the present embodiment is explained with reference to FIG. 10 and FIG. 11. In the explanation of the present embodiment, the same numerical references are attached to the same configurations as those of the above-described embodiments and explanation of the duplicated contents is omitted.

In the printer image processing unit 400 of the first embodiment, in the power-saving mode, all the SRAMs 421A, 421B, and 421C in the resume standby area 420 are controlled so as to similarly make a transition into the RS mode. In contrast to this, in the printer image processing unit 400 of the present embodiment, in the power-saving mode, it is possible for the power control unit 216 to switch between the control to cause the SRAM to make a transition into the RS mode and the control to shut off the power supply to the SRAM.

Figure 10:
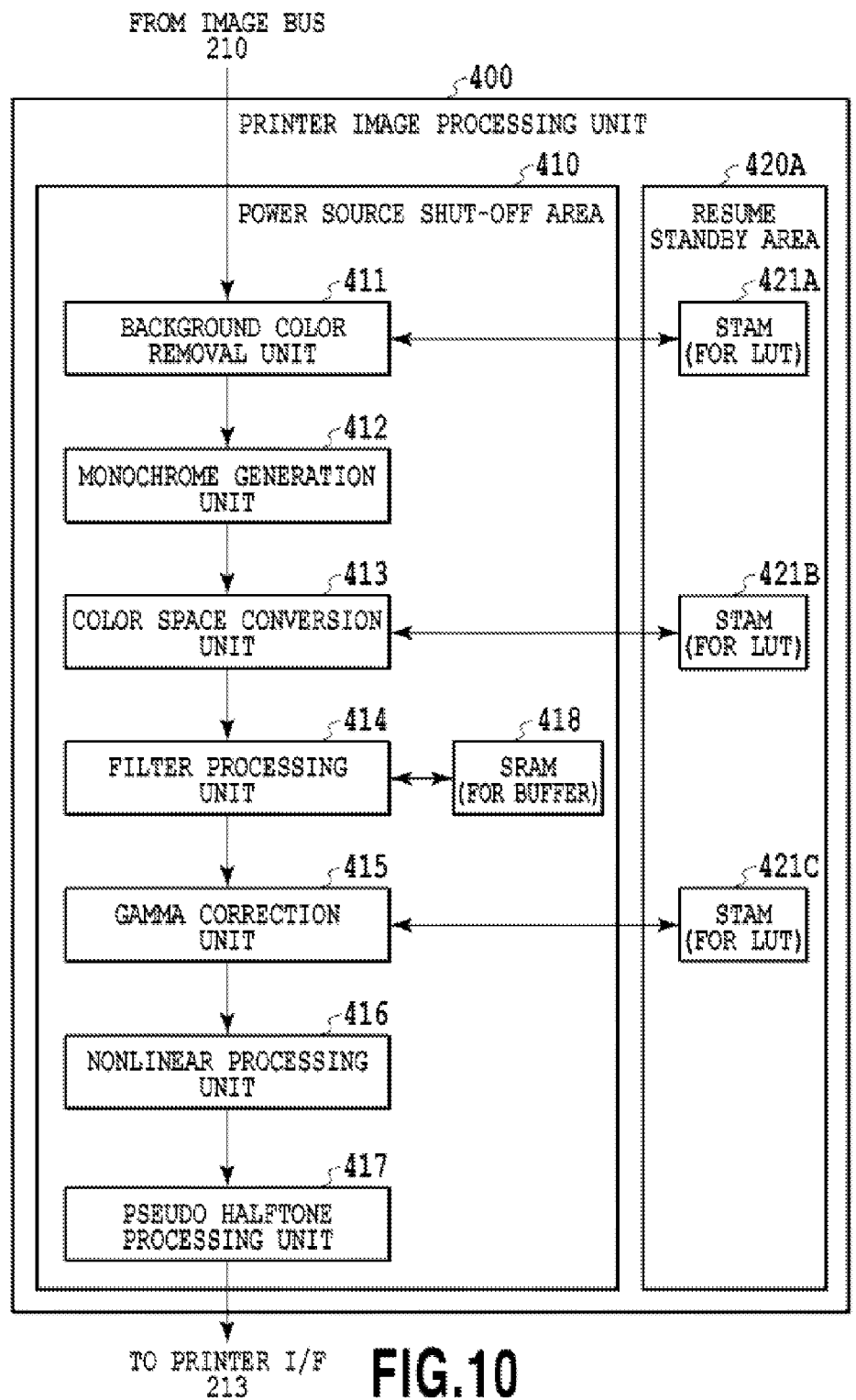
FIG. 10 is a function block diagram of a printer image processing unit in a third embodiment.

FIG. 10 is a function block diagram of the printer image processing unit 400 in the present embodiment. In the present embodiment, explanation is given by showing only the function block diagram of the printer image processing unit 400, but it is also possible to cause the scanner image processing unit 300 to have the same configuration.

In the present embodiment, the SRAMs 421A, 421B, and 421C for LUT are arranged in the resume standby area 420A and it is possible for the power control unit 216 to control the power supply to the resume standby area 420A independently of the power source shut-off area 410. That is, it is possible for the power control unit 216 to switch between on and off of the power supply to the SRAMs 421A, 421B, and 421C in the resume standby area 420A. Further, in the power-saving mode, it is possible for the power control unit 216 to supply minimum power necessary to hold data to the SRAMs 421A, 421B, and 421C and to cause the SRAMs 421A, 421B, and 421C to make a transition into the RS mode.

In the present embodiment, it is possible for the CPU 201 to determine the behavior of the power control unit 216 in the power-saving mode based on the setting whose input has been received from a user. For example, in the case where a user performs a setting that gives priority to a reduction in the time taken to return to the normal power mode via the operation unit 102, which is a setting input unit, the CPU 201 instructs the power control unit 216 to cause the SRAMs 421A, 421B, and 421C to make a transition into the RS mode. On the other hand, in the case where a user performs a setting that gives priority to suppression of power consumption, the CPU 201 instructs the power control unit 216 to shut off the power supply to the SRAMs 421A, 421B, and 421C. It is not necessary to input the setting via the operation unit 102 and it may also be possible to read the setting information stored in advance in the ROM 203 or to input the setting via the LAN 106 or the public line.

Figure 11:
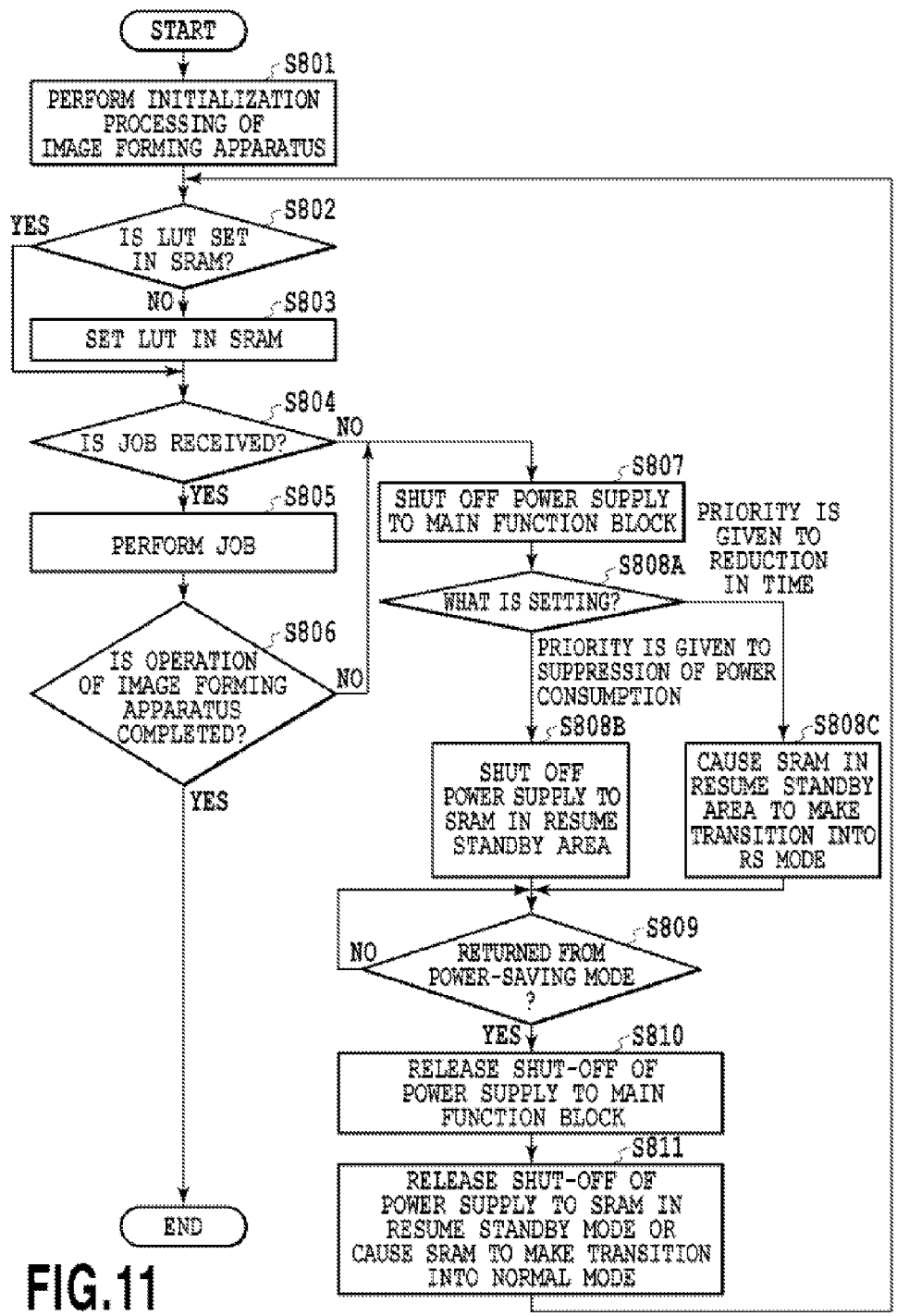
FIG. 11 is a flowchart showing a procedure of a transition sequence in the third embodiment.

FIG. 11 is a flowchart showing the procedure of the transition sequence of the power mode in the present embodiment. The processing by this flowchart is implemented by the CPU 201 of the main controller 101 executing the program stored in the ROM 203. The processing at S801 to S807 is the same as that of the above-described first embodiment, and therefore, explanation is omitted.

At S808A, the CPU 201 determines whether the setting whose input has been received is a setting that gives priority to suppression of power consumption in the power-saving mode or a setting that gives priority to a reduction in the time taken to return to the normal power mode.

In the case where it is determined that the setting is a setting that gives priority to suppression of power consumption (S808A: priority is given to suppression of power consumption), the processing proceeds to S808B and the power control unit 216 shuts off the power supply to the SRAMs 421A, 421B, and 421C. On the other hand, in the case where it is determined that the setting is a setting that gives priority to a reduction in the time taken to return to the normal power mode (S808A: priority is given to a reduction in time), the processing proceeds to S808C and the power control unit 216 causes the SRAMs 421A, 421B, and 421C to make a transition into the RS mode.

In the case where it is determined that the normal power mode is returned (S809: YES), at S810, the CPU 201 causes the power control unit 216 to release the shut-off of the power supply to the main function block of the main controller 101.

At S811, the CPU 201 causes the power control unit 216 to release the shut-off of the power supply to the SRAM 421 in the resume standby area 420A. Alternatively, the CPU 201 instructs the power control unit 216 to resume the power supply to the SRAM 421 in the resume standby area 420A and to cause the SRAM 421 to make a transition into the normal power mode from the RS mode.

As explained above, it is possible for the image forming apparatus of the present embodiment to implement power control of the image forming apparatus in view of the balance between the reduction in the time taken to return to the normal power mode and the suppression of power consumption, in addition to the effect of the above-described embodiments.

[Other Embodiments]

In the above-described embodiments, the examples in which the power supply to the image processing module group within the image forming apparatus is controlled are explained. However, the application of the present invention is not limited only to the image forming apparatus including a printer, and it is also possible to apply the present invention to an apparatus including a live-view monitor, such as a digital camera.

Further, it is also possible to apply the present invention to an image processing apparatus, such as a main controller and a semiconductor integrated circuit, such as an ASIC, independently of the apparatus. In this case, the image processing apparatus includes a power source control unit, an image processing unit, and a storage area (SRAM) and in the power-saving mode of the image processing apparatus, the image processing apparatus causes the SRAM in the resume standby area to make a transition into the RS mode while stopping the power supply to the SRAM in the power source shut-off area.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to cause both suppression of power consumption and a reduction in return time to coexist in an image forming apparatus having a normal power mode and a power-saving mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-001754, filed Jan. 7, 2016, which is hereby incorporated by reference wherein in its entirety.

What is claimed is:

1. A semiconductor integrated circuit comprising:
a first image processing circuit configured to perform first image processing;
a second image processing circuit configured to perform second image processing;
a first SRAM configured to temporarily store image data for which the first image processing has been performed by the first image processing circuit;
a second SRAM configured to store a parameter for performing the second image processing for image data that is input to the second image processing circuit; and
a processor configured to stop power supply to at least a storage area of the first SRAM in which the image data is stored, continue to supply power to a storage area of the second SRAM in which the parameter is stored, and to stop power supply to a control area for controlling to write data to the storage area of the second SRAM, based on a condition for shifting the semiconductor integrated circuit into a power-saving mode.

2. The semiconductor integrated circuit according to claim 1, wherein
the parameter requires a predetermined time or more to be set again to the second SRAM.

3. The semiconductor integrated circuit according to claim 1, further comprising:
a user interface configured to receive a setting from a user, wherein
the processor:
based on the condition, continues to supply power to the storage area of the second SRAM, and stops power supply to the control area in a case where the setting is a first setting; and
stops power supply to the second SRAM in a case where the setting is a second setting different from the first setting.

4. The semiconductor integrated circuit according to claim 1, wherein
the parameter for performing the second image processing is written to the storage area of the second SRAM by direct memory access.

5. The semiconductor integrated circuit according to claim 1, wherein
the parameter for performing the second image processing is a lookup table that is referred to in the second image processing.

6. The semiconductor integrated circuit according to claim 5, wherein
the lookup table is a conversion table that is referred to in color space conversion processing.

7. The semiconductor integrated circuit according to claim 5, wherein
the lookup table is a conversion table that is referred to in gamma correction processing.

8. The semiconductor integrated circuit according to claim 1, wherein
the image data that is stored temporarily in the first SRAM is pixel data in image data for which the first image processing is to be performed and is pixel data that is referred to in a matrix arithmetic operation using a filter.

9. A control method of a semiconductor integrated circuit having:
a first image processing circuit configured to perform first image processing;
a second image processing circuit configured to perform second image processing;
a first SRAM configured to temporarily store image data for which the first image processing has been performed by the first image processing circuit; and
a second SRAM configured to store a parameter for performing the second image processing for image data that is input to the second image processing circuit, the control comprising the step of:
controlling to stop power supply to the first SRAM, continue to supply power to a storage area of the second SRAM in which the parameter is stored, and to stop power supply to a control area for writing data to the storage area of the second SRAM, based on that a condition to cause the semiconductor integrated circuit to make a transition into a power-saving mode is satisfied.

10. The control method according to claim 9, wherein
the second SRAM stores a parameter for performing the second image processing and which requires a predetermined time or more to be set again to the second SRAM in a case where the parameter is lost.

11. The control method according to claim 9, further comprising the steps of:
a setting inputting of receiving an input of a setting from a user, wherein
in the control step:
power is continued to supply to a storage area of the second SRAM in which the parameter is stored, and power supply to a control area for writing data to the storage area of the second SRAM is stopped in a case where the setting indicates a setting that gives priority to a reduction in time taken to return from the power-saving mode to a normal power mode in which power consumption is larger than that in the power-saving mode; and
power supply to the second SRAM is stopped in a case where the setting indicates a setting that gives priority to suppression of the power consumption.

12. The control method according to claim 9, wherein
the parameter for performing the second image processing is written to the storage area of the second SRAM by direct memory access.

13. The control method according to claim 9, wherein
the parameter for performing the second image processing is a lookup table that is referred to in the second image processing.

14. The control method according to claim 13, wherein
the lookup table is a conversion table that is referred to in color space conversion processing.

15. The control method according to claim 13, wherein
the lookup table is a conversion table that is referred to in gamma correction processing.

16. The control method according to claim 9, wherein
the image data that is stored temporarily in the first SRAM is pixel data in image data for which the first image processing is to be performed and is pixel data that is referred to in a matrix arithmetic operation using a filter.

17. The semiconductor integrated circuit according to claim 1, wherein the processor is configured to stop power supply to the storage area of the first SRAM in which the image data is stored and a control area for controlling to write data to the storage area of the first SRAM, based on the condition.

18. The semiconductor integrated circuit according to claim 17, wherein the processor is able to stop power supply to the control area of the first SRAM and continue to supply power to the storage area of the first SRAM.

19. The semiconductor integrated circuit according to claim 1, wherein
the processor controls so that a predetermined signal is output based on the condition, and
the control area of the second SRAM continues to supply power to the storage area of the second SRAM and stops power supply to the control area in accordance with the predetermined signal.

* * * * *